United States Patent
Napper

(10) Patent No.: US 7,881,536 B2
(45) Date of Patent: *Feb. 1, 2011

(54) IDENTIFYING A STRING FORMED FROM A NUMBER OF HAND-WRITTEN CHARACTERS

(75) Inventor: Jonathon Leigh Napper, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 12/831,244

(22) Filed: Jul. 6, 2010

(65) Prior Publication Data

US 2010/0278430 A1    Nov. 4, 2010

Related U.S. Application Data

(63) Continuation of application No. 12/202,384, filed on Sep. 1, 2008, now Pat. No. 7,756,336, which is a continuation of application No. 10/492,161, filed as application No. PCT/AU02/01392 on Oct. 15, 2002, now Pat. No. 7,444,021.

(30) Foreign Application Priority Data

Oct. 15, 2001  (AU) ................................. PR8246

(51) Int. Cl.
  *G06K 9/18*  (2006.01)
  *G06K 9/72*  (2006.01)
(52) U.S. Cl. ........................... 382/186; 382/229
(58) Field of Classification Search ................. 382/100, 382/173–179, 186–188, 220, 229, 309–311; 348/148; 345/159–161, 173
See application file for complete search history.

(56) References Cited

U.S. PATENT DOCUMENTS

| | | | |
|---|---|---|---|
| 4,731,857 A | 3/1988 | Tappert | |
| 5,151,950 A | 9/1992 | Hullender | |
| 5,526,443 A | 6/1996 | Nakayama et al. | |
| 5,642,435 A | 6/1997 | Loris et al. | |
| 5,778,361 A | 7/1998 | Nanjo et al. | |
| 5,796,867 A | 8/1998 | Chen et al. | |
| 6,125,208 A * | 9/2000 | Maier et al. | 382/228 |
| 6,665,436 B2 * | 12/2003 | Su et al. | 382/177 |
| 2003/0108239 A1 * | 6/2003 | Su et al. | 382/177 |

FOREIGN PATENT DOCUMENTS

| | | |
|---|---|---|
| JP | 02-090384 | 3/1990 |
| JP | 07-182462 | 7/1995 |
| JP | 08-180137 A | 7/1996 |
| JP | 2000-036008 | 2/2000 |

* cited by examiner

*Primary Examiner*—Samir A Ahmed
*Assistant Examiner*—Mehdi Rashidian

(57) ABSTRACT

A method of identifying a string formed from a number of hand-written characters is disclosed. The method starts by determining character probabilities for each hand-written character in the string. Each character probability represents the likelihood of the respective hand-written character being a respective one of a number of predetermined characters. Next, template probabilities for the string are determined. Each template probability represents the likelihood of the string corresponding to a respective one of a number of templates. Each template represents a respective combination of character types. The step of determining the template probabilities for the string includes the sub-steps of determining the number of characters in the string, selecting templates having an identical number of characters, and obtaining a template probability for each selected template.

6 Claims, 1 Drawing Sheet

IDENTIFYING A STRING FORMED FROM A NUMBER OF HAND-WRITTEN CHARACTERS

CROSS REFERENCES TO RELATED APPLICATIONS

The present application is a Continuation of U.S. Ser. No. 12/202,384 filed Sep. 1, 2008, which is a Continuation of U.S. Ser. No. 10/492,161 filed Apr. 9, 2004, now issued U.S. Pat. No. 7,444,021, which is a 371 of PCT/AU02/01392 filed on Oct. 15, 2002 all of which are herein incorporated by reference.

TECHNICAL FIELD

The present invention relates to a method and apparatus for identifying a string formed from a number of hand-written characters, and in particular, to identifying hand-written text.

BACKGROUND ART

The reference to any prior art in this specification is not, and should not be taken as, an acknowledgment or any form of suggestion that the prior art forms part of the common general knowledge.

One of the major issues faced in the development of highly accurate handwriting recognition systems is the inherent ambiguity of handwriting. Humans depend on contextual knowledge to correctly decode handwritten text. As a result, a large amount of research has been directed at applying syntactic and linguistic constraints to handwritten text recognition. Similar work has been performed in the field of speech recognition, natural language processing, and machine translation.

In a handwriting recognition system, the fundamental language primitive is a character. While some recognition systems bypass character recognition altogether (known as holistic word recognition) most recognition systems make some attempt to identify individual characters in the input signal. Systems that do not do this are overly dependent on dictionaries during recognition, and support for the recognition of out-of-vocabulary words (i.e. words not in the dictionary) is usually not available.

In systems that do utilise character recognition, the raw output of a character classifier inevitably contains recognition errors due to the inherent ambiguity of handwriting. As a result, some kind of language-based post-processing is generally required to resolve the real meaning of the input.

Many systems include simple heuristics that define a set of language rules for handwritten text. Thus, for example, capital letters are most often found at the start of words (as a counter-example, "MacDonald"), most strings are usually all letters or all numbers (as a counter-example, "2nd") and rules that define the likely position of punctuation characters within a word. However, these heuristics are time-consuming and difficult to define, fragile to change, and are usually incomplete.

In addition to the above heuristics, some recognition systems include a character N-gram model. An example of this is described in H. Beigi and T. Fujisaki, "A Character Level Predictive Language Model and Its Application to Handwriting Recognition", *Proceedings of the Canadian Conference on Electrical and Computer Engineering*, Toronto, Canada, Sep. 13-16, 1992, Vol. I, pp. WA1.27.1-4.

In particular, these systems utilise language models defining the probability of observing a certain character given a sequence of previous characters. For example, the letter 'e' is much more likely to follow 'th' than the letter 'q'. That is, P(e|th) is much greater than P(q|th). Character N-grams can be easily derived from a text corpus and are a powerful technique in improving character recognition without constraining the writer to a specific list of words.

Even so, with large numbers of letter combinations provided in a given language, the use of such systems is limited, and requires very data intensive processing, thereby limiting the range of applications of the technique.

Furthermore, in some situations, the recognition system is expecting a certain format for the input (for example, U.S. Zip codes, phone numbers, street addresses, etc.) In these cases, the use of regular expressions, simple language templates, and constrained character sets can be used to increase recognition accuracy. However, the use of these techniques is limited to circumstances in which strict adherence to limited formats is provided. Thus, for example, the technique will only apply to the post codes, or the like, for which the system is trained and will not apply to general handwritten text.

Handwritten text also exhibits ambiguity not only at the character level, but also at the word level, particularly in cursive writing. Recognition systems address this issue by including word-based language models, the most common of which is the use of a pre-defined dictionary.

Word N-grams, which are similar to character N-grams but define transition probabilities between sequences of words rather than characters, can be used for the post-processing of written text. To avoid the combinatorial memory and processing requirements for large-vocabulary word N-grams, some systems use word-class N-grams, where the transition probabilities are defined for the part-of-speech tag of the word (e.g. noun or verb) rather than for individual words.

Other systems use Markov models of syntax for word disambiguation. An example of this is described in D. Tugwell, "A Markov Model of Syntax", Paper presented at the 1st CLUK Colloquium, University of Sunderland, UK 1998.

Another approach to word modelling is the identification of word collocations, sequences of two or more words that have the characteristics of a syntactic or semantic unit, as described for example in C. Manning and H. Schutze, "Foundations of Statistical Natural Language Processing", The MIT Press, Cambridge, Mass., US 1999.

However, again, the use of language post processing is data intensive, thereby limiting the applications in which the techniques may be applied.

Examples of some the techniques outlined above will now be described in more detail.

H. Beigi and T. Fujisaki describe in "A Flexible Template Language Model and its Application to Handwriting Recognition", *Proceedings of the Canadian Conference on Electrical and Computer Engineering*, Toronto, Canada, Sep. 13-16, 1992, Vol. I, pp. WA1.28.1-4, a generic template language model for use in situations that "are very limited in format or their vocabulary". In this case, templates are applied by integrating an elastic-matching character-classification score with a model probability using a search heuristic. The use of an N-gram character model used to estimate the probability of a character based on the previous N−1 characters is also described.

In this system, "the set of characters which are supported in the N-gram character predictor is a—z plus space", as described in more detail in H. Beigi and T. Fujisaki, "A Character Level Predictive Language Model and Its Application to Handwriting Recognition", *Proceedings of the Canadian Conference on Electrical and Computer Engineering*, Toronto, Canada, Sep. 13-16, 1992, Vol. I, pp. WA1.27.1-4.

Furthermore, in H. Beigi, "Character Prediction for On-Line Handwriting Recognition", *Canadian Conference on Electrical and Computer Engineering*, IEEE, Toronto, Canada, September 1992, it is described that "N=4 is shown to be optimal for practical on-line handwriting recognition".

Similarly, J. Pitrelli and E. Ratzlaff, describe in "Quantifying the Contribution of Language Modeling to Writer-Independent On-line Handwriting Recognition", *Proceedings of the Seventh International Workshop on Frontiers in Handwriting Recognition*, Sep. 11-13 2000, Amsterdam, the use of character N-grams and word N-grams in a Hidden Markov Model (HMM) cursive handwriting recognition system.

A word unigram and bigram language model derived from a corpus to perform holistic word recognition of handwritten text is described in U. Marti and H. Bunke, "Handwritten Sentence Recognition", *Proceedings of the 15th International Conference on Pattern Recognition*, Barcelona, Spain, 2000, Volume 3, pages 467-470. In this case, the Viterbi algorithm uses classifier scores and word probabilities to decode input text sentences.

Bouchaffra et al describe the use of non-stationary Markov models as a post-processing step in the recognition of U.S. Zip codes in "Post processing of Recognized Strings Using Non-stationary Markovian Models", *IEEE Transactions Pattern Analysis and Machine Intelligence*, 21(10), October 1999, pp 990-999. In this case, domain-specific knowledge that Zip codes have a fixed length, and each digit in the code has a specific physical meaning is used to aid recognition. In particular, using a training set of Zip codes provided by the United States Postal Service, transition probabilities for each digit at each point in the digit string were computed, with this knowledge being applied to improve recognition performance.

L. Yaeger, B. Webb, and R. Lyon, "Combining Neural Networks and Context-Driven Search for On-Line, Printed Handwriting Recognition in the Newton", *AI Magazine*, Volume 19, No. 1, p. 73-89, AAAI 1998 describes implementing various weakly applied language modelling techniques to define a lexical context for a commercial hand-printed character recognition system. This scheme allows the definition and combination of "word lists, prefix and suffix lists, and punctuation models", including some that are "derived from a regular expression grammar". The dictionaries and lexical templates can be searched in parallel, and include a prior probability for each expression. The syntactic templates are hand-coded and probabilities are derived from empirical analysis.

R. Srihari, "Use of Lexical and Syntactic Techniques in Recognizing Handwritten Text", *ARPA Workshop on Human Language Technology*, Princeton, N.J., March 1994 describes using a combination of lexical and syntactic techniques to disambiguate the results of a handwriting recognition system. Specifically, the technique applies word collocation probabilities to promote or propose words based on context, and uses a Markov model of word syntax based on part-of-speech tagging.

U.S. Pat. No. 6,137,908, describes using a trigram language model in combination with other heuristics to improve the accuracy of character segmentation and recognition.

In U.S. Pat. No. 6,111,985, a character grammar during recognition, and a traditional maximum likelihood sequence estimation algorithm (i.e. Viterbi decoding) are used to disambiguate words from numeric strings using an N-gram character model.

Similarly, the handwritten word recognition system described in U.S. Pat. No. 5,392,363, uses character- and word-grammar models for disambiguation in a frame-based probabilistic classifier.

U.S. Pat. No. 5,787,197, uses a dictionary-based post-processing technique for online handwriting recognition. The dictionary search strips all punctuation from the input word, which is then matched against a dictionary. If the search fails, "a stroke match function and spell-aid dictionary is used to construct a list of possible words".

Similarly, U.S. Pat. No. 5,151,950 describes using a tree-structured dictionary as a deterministic finite automaton to merge classifier results with contextual information. This system selects "from the example strings the best-matching recognition string through Hidden Markov processing".

U.S. Pat. No. 5,680,511, uses a word-based language model "to recognize an unrecognized or ambiguous word that occurs within a passage of words." The method is described in the context of spoken or handwritten text recognition.

U.S. Pat. No. 5,377,281, employs a knowledge-based approach to post-processing character recognition strings. The knowledge source used includes word-probabilities, word di-gram probabilities, statistics that relate the likelihood of words with particular character prefixes, and rewrite suggestions and their costs, and are derived from a text corpus.

U.S. Pat. No. 5,987,170, uses a combination of word and grammatical dictionaries for the recognition of oriental script. U.S. Pat. No. 6,005,973, derives both dictionary strings and a most-likely digit string during recognition, which are presented to the writer for selection.

U.S. Pat. No. 6,084,985 describes a method for on-line handwriting recognition based on a hidden Markov model and uses real-time sensing of at least an instantaneous write position of the handwriting, deriving from the handwriting a time-conforming string of segments each associated to a handwriting feature vector. The method then matches time-conforming string to various example strings from a data base pertaining to the handwriting, and selecting from the example strings a best-matching recognition string through hidden-Markov processing.

Accordingly, it can be seen that each of the above methods suffer from a variety of disadvantages. In particular, the majority of the techniques tend to require large amounts of data processing. This can limit the circumstances in which the techniques can be implemented, in particular because powerful processors are required to perform, the recognition.

DISCLOSURE OF THE INVENTION

According to an aspect of the present invention there is provided a method of identifying a string formed from a number of hand-written characters, said method comprising the steps of:

determining by a processor character probabilities for each hand-written character in the string, each character probability representing the likelihood of the respective hand-written character being a respective one of a number of predetermined characters;

determining by the processor template probabilities for the string, each template probability representing the likelihood of the string corresponding to a respective one of a number of templates, each template representing a respective combination of character types, wherein the step of determining the template probabilities for the string comprises the sub-steps of:

determining the number of characters in the string;
selecting templates having an identical number of characters; and
obtaining a template probability for each selected template.

Other aspects are also disclosed.

BRIEF DESCRIPTION OF FIGURES

The present invention should become apparent from the following description, which is given by way of example only, of a preferred but non-limiting embodiment thereof, described in connection with the accompanying FIGURE, wherein.

MODES FOR CARRYING OUT THE INVENTION

Figure 1:
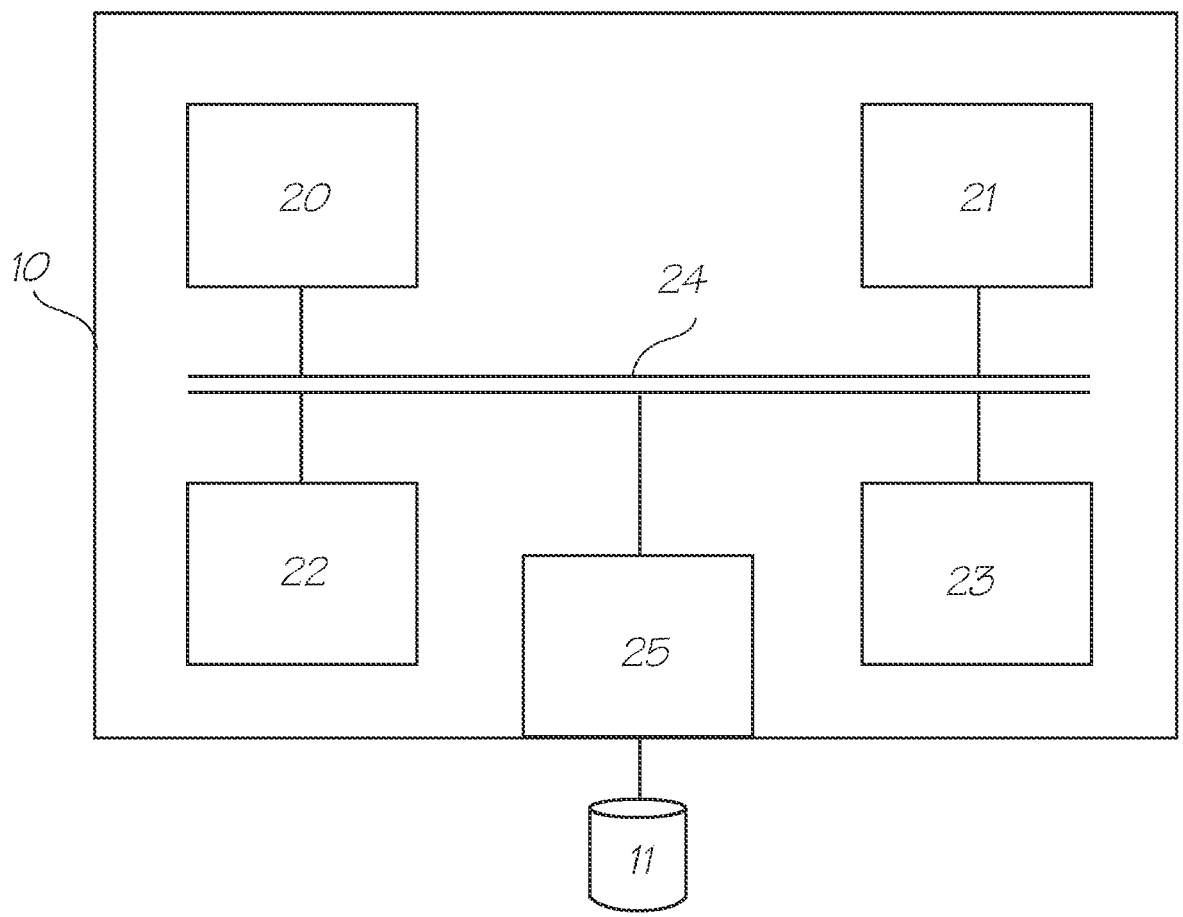
FIG. 1 is an example of a processing system suitable for performing the present invention.

The following modes are described as applied to the written description and appended claims in order to provide a more precise understanding of the subject matter of the present invention.

An example of apparatus suitable for implementing the present invention will now be described with reference to FIG. 1, which shows a processing system 10 adapted to perform handwriting recognition.

In particular, the processing system 10 generally includes at least a processor 20, a memory 21, and an input device 22, such as a graphics tablet and/or keyboard, an output device 23, such as a display, coupled together via a bus 24 as shown. An external interface is also provided as shown at 25, for coupling the processing system to a store 11, such as a database.

In use, the processing system can be adapted to perform two main functions. In particular, the processing system can be adapted to generate statistical templates from a text corpus and/or use statistical templates in the decoding of handwritten text. From this, it will be appreciated that the processing system 10 may be any form of processing system such as a computer, a laptop, server, specialised hardware, or the like, which is typically adapted to perform these techniques by executing appropriate applications software stored in the memory 21.

In the case of template generation, the processing system is adapted to analyse text, which is typically stored in the database 11. In this regard, the processor 20 operates to identify each word or string in the text and then assess the as a sequence of characters. The processor determines the types of the characters in each word or string, such as whether the characters are letters, numbers or punctuation.

The processor then determines a template representative of the string. In this regard, the template is formed from tokens representing the respective character types. Thus for example, a template for the word "the" may be of the form "aaa", where "a" represents a letter.

It will be appreciated that identical templates will be generated for different strings. Accordingly, for example, the word "cat" will result in an identical template to the word "the".

The processor 20 records the number of times each template is determined in the database 11.

Once all the words in the text have been analysed, this allows the probability of any given template occurring within a text sample to be determined. This can then be used in the recognition of hand-written text.

In particular, if the processor 20 obtains hand-written text, for example from the input device 22, or the database 11, the processor will perform an initial assessment to identify character strings, and then to attempt determine the identity of each character in the string.

In general the processor 20 will implement a character classifier which determines a number of possible character identities, together with an associated probability for each identity.

This is repeated for the entire string, such that a number of potential character identity combinations, corresponding to different potential strings, exist.

The templates described above are then accessed by the processor 20, which selects templates having the same number of characters as the respective string. The processor 20 then determines an overall probability for a particular combination of character identities and templates, to allow the most likely string to be determined.

These techniques will now be described in more detail.

Statistical Template Generation

This section describes the generation of statistical templates from a text corpus, and gives examples of templates that have been statistically derived.

Overview

Letters represent the fundamental primitive of classification for a handwritten text recognition system. In English, letters can be classified as alphabetic ('a'-'z','A'-'Z'), numeric ('0'-'9'), or punctuation (everything else). To assist in the general recognition of alphabetic characters, dictionaries and character grammars are often used for disambiguation. Generally, dictionaries and character grammars include only alphabetic characters (although apostrophes are sometimes included to model compound words such as "they're" and "he'll").

Since most language models do not include prior information about numeric and punctuation letters, recognition systems use heuristic methods to extract strings of alphabetic or numeric characters from a recognition string, which are then processed using a language model. However, these heuristic approaches are generally not very robust, leading to common misrecognition problems such as:

alphabetic strings recognized as numbers,
numeric strings recognized as alphabetic,
words containing text and numbers (e.g. 2nd, V8, B2) misrecognized as alphabetic or numeric strings,
misrecognition of punctuation as alphabetic or numeric letters, and
misrecognition of alphabetic or numeric letters as punctuation.

However, the presence of certain punctuation characters in a text sequence can actually assist in the decoding of other characters in the sequence. For example, apostrophes can be indicative of a text string, while commas, currency symbols, and periods can be indicative of numeric strings. Words that include dashes often contain a mixture of numeric and alphabetic strings (e.g. "30-year-old" or "20-pound"). In addition to this, some punctuation characters are usually found at specific locations within a string (e.g. suffix punctuation such as '?', '!', or ':').

Statistical language template processing is a method of encoding prior information regarding the structure of written text that models the interaction between alphabetic, numeric, and punctuation characters using a probabilistic model. The model considers positional information, and is able to model letter dependencies globally by considering the entire input word (rather than a fixed number of local preceding states as in character N-grams).

Letter Tokenisation

Statistical template generation is performed using a written-text corpus (a large set of text files collected from a number of sources). To generate template statistics, each file in the corpus is processed as a sequential set of letters delimited by white space (i.e. word, sentence, and paragraph markers). This sequence of letters forms a string.

During the generation of templates, individual letters are converted into tokens that represent the class (or character type) to which the letter belongs.

The definition of letter classes is domain-specific and is selected based on the ambiguity that needs to be resolved. The discussion below is based around the following classification scheme: upper and lower case alphabetic characters are converted to the token 'a', all digits are converted to the token 'd', and all remaining characters (i.e. punctuation) are not converted, and retain their original values.

The sequence of tokens that represent a word or character string define a template.

As an example, the string "15-years?" is converted to the template "dd-aaaaa?" Note that alternative tokenisation schemes could be used to model other language formations, such as upper and lower case distinction (e.g. "MacDonald" as "ullulllll" with 'u' for upper case and 'l' for lower case alphabetic characters).

Processing

The purpose of generating statistical language templates is to identify common written-text idioms, and to calculate the probability of the idiom being encountered in written text. Model training proceeds by tokenising the letters in each white-space separated word, and storing the resulting template in a table, typically in the database 11. Associated with each template is a count, which indicates the number of times the particular template has been seen in the input stream.

After all text in the corpus has been processed, the table contains a list of all templates encountered in the text, and a count of the number of times each template was seen. Obviously, commonly occurring templates (e.g. the template "aaa" representing "the", "but", or "cat") will contain much higher counts than unlikely templates (e.g. the template "ada" representing "xly" or "b2b").

To calculate the prior probabilities for a template, the template count is simply divided by the sum of all template counts. These values are can be stored as logs to avoid numerical underflow and to ease processing during recognition. The log-probability of template $t_i$ is:

$$P(t_i) = \log_{10}\left(\frac{c_i}{\sum_{j=1}^{n} c_j}\right)$$

where: $c_i$ is the number of times template i was encountered in the training text.

n is the total number of different templates

Calculating prior probabilities over all encountered templates allows templates of varying number of letters to be compared. This means that the language model can assist in decoding input where letter or word segmentation is not known, or a number of alternate segmentation paths are possible.

However, if the number of letters in an input string is known at recognition time, the template model can be partitioned such that templates are grouped by letter count. The prior probabilities can then be calculated based on the number of template counts of the template group, rather than the sum of all counts over all groups.

Smoothing

The above procedure produces a maximum-likelihood estimate (MLE) of the template probabilities based on the text corpus. That is, the calculated probabilities are those that give the highest probability when applied to the training corpus. None of the probability distribution is assigned to templates that were not encountered in the training text, and thus these templates are assigned a zero-probability.

Since the text corpus can only ever represent a subset of the potential input to the language model, a smoothing model must be applied to decrease the probability of the observed events by a small amount and assign the residual probability mass to unseen events. This procedure is commonly used in character and word N-grams, as described for example in C. Manning and H. Schutze, "Foundations of Statistical Natural Language Processing", The MIT Press, Cambridge, Mass., US 1999. The same techniques can therefore easily be applied in this situation.

In this example, Lidstones's Law, as described in "Foundations of Statistical Natural Language Processing", mentioned above has been used to smooth the generated probabilities, such that:

$$P(x_i) = \frac{c_i + \lambda}{\sum_{j=1}^{n} c_j + B\lambda}$$

where: B is the number of unique templates derived from the corpus;

$\lambda$ is a smoothing factor (empirically set to 0.5).

The result is that a non-zero probability can be assigned to word structures that have not been seen in the training corpus, allowing rare and unusual word structures to be recognised.

It will also be appreciated that more accurate probabilities will be obtained the larger the text corpus used in determining the probabilities.

Sample Results

The training procedure was run over a large text corpus, which in this example is the] D. Harman and M. Liberman, Complete TIPSTER Corpus, 1993 to generate a set of statistical language templates. Examples of the determined templates are set out below.

In particular, Table 1 contains the twenty templates with the highest frequency of occurrence in the written text corpus (and thus have the highest prior probability).

The table reveals a number of obvious properties of written text, such as short words are generally more common than longer words, and commas and periods are the most likely punctuation characters and appear as word suffixes. These rules are implicitly defined by the templates and their corresponding prior log-probability, and allow robust and statistically well-founded decoding of input.

The templates in the table given above detail a number of rather obvious language rules that could be described by a number of simple heuristics (although it is unlikely that the prior probabilities for these rules could be easily and accurately estimated).

TABLE 1

| Rank | Template | $P(t_i)$ |
|---|---|---|
| 1 | aaa | −0.779 |
| 2 | aa | −0.842 |
| 3 | aaaa | −0.918 |
| 4 | aaaaa | −1.080 |
| 5 | aaaaaaa | −1.145 |
| 6 | aaaaaa | −1.171 |
| 7 | aaaaaaaa | −1.259 |
| 8 | aaaaaaaaa | −1.394 |
| 9 | a | −1.523 |
| 10 | aaaaaaaaaa | −1.575 |
| 11 | aaaaaaaaaaa | −1.826 |
| 12 | aaaaaaa, | −2.118 |
| 13 | aaaa. | −2.158 |
| 14 | aaaaaa, | −2.165 |
| 15 | aaaaa, | −2.184 |
| 16 | aaaa, | −2.209 |
| 17 | aaaaaaaa, | −2.257 |
| 18 | aaaaaaa. | −2.260 |
| 19 | aaaaaa. | −2.293 |
| 20 | aaaaa. | −2.296 |

However, further examination of the results reveals a large number of language idioms that would be very difficult to model accurately using a heuristic approach, as detailed in Table 2. These templates model the interaction between alphabetic letters, digits, and punctuation and implicitly define a set of rules about the structure of written text.

TABLE 2

| Rank | Template | $P(t_i)$ | Example |
|---|---|---|---|
| 34 | a.a. | −2.765 | U.S., A.M., P.M., N.Y. |
| 35 | aaaa'a | −2.786 | that's, didn't, hasn't, Rome's, bank's |
| 56 | $ddd | −3.211 | $400 |
| 64 | d,ddd | −3.307 | 3,200 |
| 68 | dd % | −3.326 | 51% |
| 82 | (aaa) | −3.424 | Korea Broadcasting (KBS), agreement (but) it |
| 89 | (ddd) | −3.456 | (202) 940-5432 |
| 118 | aa'aa | −3.639 | we're, we've, he'll, we'll |
| 122 | d:dd | −3.653 | 9:08, 5:45 |
| 134 | ddaa | −3.704 | 25$^{th}$, 70$^{th}$, |
| 140 | ddd-dddd. | −3.724 | 940-1234. |
| 142 | dd-aaaa | −3.728 | 92-page, 12-mile, 10-hour, 14-foot, 30-year |
| 151 | aaa: | −3.767 | "they are:", "thus far:" |
| 153 | dd-aaa | −3.782 | 30-day, 21-gun, 35-man, 10-ton |
| 157 | ... | −3.784 | one more time . . . |
| 159 | daa | −3.809 | 1$^{st}$, 2$^{nd}$, 3$^{rd}$ |
| 164 | d.d % | −3.825 | 1.2% |
| 170 | dd-aaaa-aaa | −3.833 | 63-year-old |
| 215 | d-d | −4.036 | 4-0 vote, ruled 7-0, beaten 2-1 |
| 216 | dd-dd | −4.038 | March 14-18, 60-70 planes, 42-58 votes |
| 224 | ddda | −4.072 | 747s, 304a members, 256k RAM |
| 225 | dda | −4.073 | 20s, 30s, 40s, 50s |
| 226 | a'aa | −4.082 | I've, I'll |
| 227 | dddaa | −4.094 | 100$^{th}$, 833$^{rd}$ |
| 230 | dddda | −4.106 | 1940s, 1950s, 1960s |
| 231 | dd/dd/dd | −4.107 | 12/11/98 |
| 239 | ad | −4.141 | T4, K9, M2, U2 |
| 244 | a-aaaa | −4.166 | X-rays, C-SPAN, O-ring, A-bomb, K-mart |
| 279 | d,ddd,ddd | −4.251 | 1,000,000 |
| 283 | dd-aaaaa | −4.269 | 12-month, 10-ounce, 15-piece, 12-gauge, 18-point |
| 317 | a-d | −4.361 | B-1, M-2, V-8 |

It will be noted that the strength of this technique lies in the generation of a large number of templates, and the corresponding relative probabilities of the templates. Typically, many thousands of templates are generated, which together define a statistically well-founded set of rules regarding the structure of written text.

Statistical Template Processing

This section describes the use of statistical templates in the decoding of handwritten text. The general procedure is given, together with some example processing. A description of how to combine this technique with other language models is also given.

Overview

The aim of handwritten character recognition is to accurately convert the pen strokes generated by a writer into the corresponding text. However, handwritten text in inherently ambiguous and thus the use of contextual information is required to decode the input. The statistical templates generated as described above assist in the recognition of the general structure of the input, and can be combined with other language models such as dictionaries and character grammars during recognition.

Most character classification systems generate a set of possible letter matches and associated confidence scores for an input letter. For example, when classifying a letter 'a', a classifier letter hypothesis could be as set out in Table 3 below.

TABLE 3

| Letter | $P(x_i)$ |
|---|---|
| 'a' | .6 |
| 'd' | .3 |
| 'o' | .1 |

This indicates (informally) that the classifier is 60% confident that the letter is an 'a', 30% confident that the letter is a 'd', and so on. Note that for statistical processing, the scores should conform to the rules of probability, that is:

$$0 \leq P(x_i) \leq 1 \text{ for all } i$$

and, $$\sum_{i=1}^{n} P(x_i) = 1$$

For classifiers that do not generate probabilities (for example, classifiers that report distance values), the output score vector should be normalised to ensure the above rules hold. For neural network classifiers, a normalised transformation function (such as the softmax activation function described in J. Briddle, "Probabilistic Interpretation of Feed-forward Classification Network Outputs, with Relationships to Statistical Pattern Recognition", Neuro-computing: Algorithms, Architectures, and Applications, pp. 227-236, New York, Springer-Verlag, 1990) can be used to normalise the output values.

Decoding

Decoding is performed on a set of letter hypotheses generated by a character classifier that represents an input word or series of words. The probabilities associated with the templates mean that features such as word lengths and the location of punctuation characters can be used for statistical word segmentation. Since the statistical templates are able to estimate the probability of a specific word structure, they can be used to assist with word segmentation if required.

However, the description given below assumes that word segmentation has been performed, and the decoding procedure is only required to find the most likely letter sequence given the output of the character classifier. This is done by finding the template that gives the maximum score given the character probabilities generated by the classifier combined with the prior probability of the template likelihood:

$$P(w_i) = P(t_i) \times \prod_{j=1}^{n} P(x_{ij})$$

where: n=number of letters in the input string
  $P(w_i)$=the letter sequence probability
  $P(x_{ij})$=the classifier score for the token at position j in template $t_i$ (see below)
  $P(t_i)$=the prior probability of template $t_i$ When calculating the value of $P(x_{ij})$, the highest scoring member (using the classifier hypothesis at letter position j) of the token class is used. For example, if the template contains an 'a', the score of the highest ranked alphabetic character is used. Similarly if the template contains a 'd', the score of the highest ranked digit is used. For punctuation, the score of the specified punctuation character is used.

If log-probabilities are used for the templates, the classifier output must also be converted to log-probabilities, and the decoding procedure finds the maximum of:

$$P(w_i) = P(t_i) + \sum_{j=1}^{n} P(x_{ij})$$

As an example, assume a classifier has produced the scores shown in Table 4 from the input string "30-day", for the characters indicated.

TABLE 4

| $P(x_1)$ | | $P(x_2)$ | | $P(x_3)$ | | $P(x_4)$ | | $P(x_5)$ | | $P(x_6)$ | |
|---|---|---|---|---|---|---|---|---|---|---|---|
| 3 | 0.87 | o | 0.50 | — | 0.97 | d | 0.53 | a | 0.58 | y | 0.53 |
| z | 0.08 | 0 | 0.48 | r | 0.02 | a | 0.40 | e | 0.40 | g | 0.45 |
| r | 0.05 | c | 0.02 | 1 | 0.01 | 8 | 0.07 | 0 | 0.02 | 9 | 0.02 |

In this example, the correct decoding path is shown in bold.

If these scores are converted to log-probabilities and applied to all templates of matching length, then the highest scoring templates are as set out in Table 5.

TABLE 5

| Template | Text | $P(t_i)$ | $P(w_i)$ |
|---|---|---|---|
| dd-aaa | 30-day | −3.782 | −4.963 |
| aaaaaa | zorday | −1.171 | −5.056 |
| dddddd | 301809 | −4.549 | −6.932 |

Where:
$P(t_i)$ is the prior probability of the template as statistically derived from the text corpus.

To calculate $P(w_i)$ for the template "dd-aaa", the calculation performed by the processor 20 is as follows:

$$P(w_i) = -3.782 - 0.060 - 0.319 - 0.013 - 0.276 - 0.237 - 0.276$$
$$= -4.963$$

To calculate $P(w_i)$ for template "aaaaaa", the calculation is:

$$P(w_i) = -1.171 - 1.097 - 0.301 - 1.699 - 0.276 - 0.237 - 0.276$$
$$= -5.056$$

To calculate $P(w_i)$ for template "dddddd", the calculation is:

$$P(w_i) = -4.549 - 0.060 - 0.319 - 2.000 - 1.155 - 1.699 - 1.699$$
$$= -6.932$$

The highest scoring template ("dd-aaa") is found, and the corresponding text is selected as the correct string ("30-day").

It will be noted that the maximum-likelihood decoding (i.e. taking the most likely character at each position) will not find the correct text (as "3o-day" is the maximum-likelihood sequence).

Language Model Combination

In the example given above, the string of the best matching template was selected as the decoded string. Usually, however, the matched template will be combined with other language models for additional processing.

For example, rather than taking the maximum-likelihood letters from the alphabetic section of the string (i.e. "day"), the classifier scores from this segment can be passed to a dictionary or character grammar for further decoding.

Alternatively, the text segments from a number of top scoring templates can be processed using an additional language model, with the resulting scores being combined to produce a final word probability.

Accordingly, it will be appreciated that the process described above provides a method for contextual processing using statistical language templates for handwritten character recognition. This includes procedures required to generate the templates from a text corpus, together with the techniques required to decode character classifier output using the templates.

In particular, these techniques generally allow faster, more accurate hand writing recognition to be performed, using less processing power, than in the prior art methods.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

Although the preferred embodiment has been described in detail, it should be understood that various changes, substitutions, and alterations can be made herein by one of ordinary skill in the art without departing from the scope of the present invention as hereinbefore described and as hereinafter claimed.

The invention claimed is:
1. A method of identifying a string formed from a number of hand-written characters, said method comprising the steps of:
  determining by a processor character probabilities for each hand-written character in the string, each character probability representing the likelihood of the respective hand-written character being a respective one of a number of predetermined characters;

determining by the processor template probabilities for the string, each template probability representing the likelihood of the string corresponding to a respective one of a number of templates, each template representing a respective combination of character types, wherein the step of determining the template probabilities for the string comprises the sub-steps of:

determining the number of characters in the string;

selecting templates having an identical number of characters; and obtaining a template probability for each selected template.

2. The method of claim 1, wherein each predetermined character has a respective character type.

3. The method of claim 1, wherein the character types include at least one of digits, letters, and punctuation marks.

4. The method of claim 1, wherein the processor is configured to determine the character probabilities including using a character classifier.

5. The method of claim 1, wherein the template probability is determined by statistical analysis of a text corpus.

6. The method of claim 1, further comprising the steps of determining a potential character string corresponding to each template by determining the character type of each character in the string from the template, and selecting one of the predetermined characters for each character in the template, the predetermined character being selected in accordance with the determined character type and the character probability.

* * * * *